(12) United States Patent
Behl et al.

(10) Patent No.: US 8,580,073 B2
(45) Date of Patent: Nov. 12, 2013

(54) HOT MELT ADHESIVE COMPOSITIONS AND METHODS FOR THEIR PREPARATION AND USE

(75) Inventors: Daniel Behl, Midland, MI (US); Glen Gordon, Midland, MI (US); Loren Lower, Sanford, MI (US); Ross Noel, Midland, MI (US)

(73) Assignee: Dow Corning Coporation, Midland, MI (US)

( * ) Notice: Subject to any disclaimer, the term of this patent is extended or adjusted under 35 U.S.C. 154(b) by 278 days.

(21) Appl. No.: 13/000,751

(22) PCT Filed: Jun. 18, 2009

(86) PCT No.: PCT/US2009/047721
§ 371 (c)(1),
(2), (4) Date: Dec. 22, 2010

(87) PCT Pub. No.: WO2010/008749
PCT Pub. Date: Jan. 21, 2010

(65) Prior Publication Data
US 2011/0104506 A1   May 5, 2011

Related U.S. Application Data

(60) Provisional application No. 61/075,030, filed on Jun. 24, 2008.

(51) Int. Cl.
*C04B 37/00* (2006.01)
*C09J 7/02* (2006.01)
*B32B 9/04* (2006.01)

(52) U.S. Cl.
USPC .......................... 156/325; 156/329; 428/447

(58) Field of Classification Search
USPC .................................. 156/325, 329; 428/447
See application file for complete search history.

(56) References Cited

U.S. PATENT DOCUMENTS

| | | | |
|---|---|---|---|
| 2,676,182 A | 4/1954 | Daudt et al. | |
| 4,611,042 A | 9/1986 | Rivers-Farrell et al. | |
| 4,774,310 A | 9/1988 | Butler | |
| 5,340,887 A | 8/1994 | Vincent et al. | |
| 5,508,360 A | 4/1996 | Cifuentes et al. | |
| 5,561,203 A | 10/1996 | Strong et al. | |
| 5,905,123 A * | 5/1999 | Cifuentes et al. | 525/477 |
| 6,433,055 B1 | 8/2002 | Kleyer et al. | |

FOREIGN PATENT DOCUMENTS

| | | |
|---|---|---|
| EP | 0628617 A2 | 12/1994 |
| EP | 0628618 A2 | 12/1994 |
| JP | H07-70541 A | 3/1995 |
| JP | 2006-503958 A | 2/2006 |
| WO | WO 2004/037941 A2 | 5/2004 |
| WO | WO 2004037941 A2 | 5/2004 |
| WO | WO 2009/091463 A1 | 7/2009 |

OTHER PUBLICATIONS

International Search Report for Application No. PCT/US2009/047721 dated Jun. 18, 2009, 6 pages.
English language abstract not available for JP H07-70541; however, see English language equivalent US 5,340,887. Original Document extracted from the espacenet.com database on Jun. 27, 2013, 11 pages.
English language abstract not available for JP 2006-503958; however, see English language equivalent WO 2004/037941. Original document extracted from the espacenet.com database on Jun. 27, 2013, 27 pages.

* cited by examiner

*Primary Examiner* — Philip C. Tucker
(74) *Attorney, Agent, or Firm* — Howard & Howard Attorneys PLLC

(57) ABSTRACT

A hot melt adhesive composition can be used to laminate substrates together in construction industry and industrial maintenance and assembly applications. The hot melt adhesive composition is sprayable to form a thin layer (1 to 200 microns in thickness) on a substrate. The hot melt adhesive can cure by exposure to moisture or harden by cooling, or a combination thereof.

25 Claims, 1 Drawing Sheet

HOT MELT ADHESIVE COMPOSITIONS AND METHODS FOR THEIR PREPARATION AND USE

CROSS REFERENCE

This application claims priority to and all the advantages of International Patent Application No. PCT/US2009/047721, filed on Jun. 18, 2009, which claims priority to U.S. Provisional Patent Application Ser. No. 61/075,030 filed on 24 Jun. 2008.

FIELD OF THE INVENTION

An adhesive composition and method for its preparation and use are disclosed. The adhesive product prepared by exposing the adhesive composition to moisture and/or by cooling the adhesive composition is useful in the construction industry and industrial maintenance and assembly for applications such as forming laminates.

BACKGROUND OF THE INVENTION

Moisture curable organosiloxane compositions find use in various applications, for example as sealant compositions that can be applied to a joint between elements and cured to provide an elastomeric seal between them. These compositions cure at room temperature and are particularly attractive for sealing, for example highway joints, joints in articles such as vehicle headlights and joints in buildings and in glazing applications, because no special heating or other cure conditions are generally required to produce a seal of desired quality.

Many moisture curable organosiloxane compositions have been proposed and are generally formed from an at least one substantially linear polyorganosiloxane containing at least two silanol groups, a crosslinker capable of reaction with the polyorganosiloxane to yield a crosslinked network, and catalyst materials. These compositions cure by a condensation reaction promoted by moisture.

The crosslinker in moisture curable organosiloxane compositions is generally selected from polyfunctional silanes that readily hydrolyze. Commonly employed crosslinkers are triacetoxy silanes, trialkoxy silanes, triamino silanes and trioximo silanes. It is believed that the condensation reaction proceeds via a capping of the polyorganosiloxane with, for example, dialkoxyalkylsilyl groups followed by interaction of the alkoxy groups of the end caps and or silanol groups to yield a crosslinked structure.

While some curing of the composition during manufacture and storage is acceptable, it is important that this curing does not proceed too far prior to application at its intended work site, at which it is intended to cure under influence of atmospheric moisture. Thus the exposure of the composition to moisture should be kept to a uniform, acceptably low extent from batch to batch during manufacture and storage, otherwise the composition cures to an extent that renders it impractical for its intended purpose.

Moisture curable compositions based on organosilicon compounds generally contain finely divided fillers. The fillers generally used are those that strengthen the cured material, reduce the cost of the product or otherwise confer a desired combination of properties.

Typical fillers include but are not limited to high surface area silicas, ground quartz, iron oxide, zinc oxide, carbon black, calcium carbonate and diatomaceous earth. Moisture curable organosiloxane compositions can be manufactured using a batch or continuous process during which the filler and polyorganosiloxane are mixed together, the crosslinker and catalyst are added to the mixture and the resultant composition is then packaged in containers such as cartridges, pails, or drums, which are then sealed in an airtight manner to prevent ingress of moisture.

Silicone pressure-sensitive adhesives (hereinafter also referred to as PSAs) typically contain at least two primary components, namely a linear siloxane polymer and a tackifier resin consisting essentially of triorganosiloxane units (i.e., $R_3SiO_{1/2}$ units. in which R denotes a monovalent organic group) and silicate units (i.e., $SiO_{4/2}$ units). In addition to the above two ingredients, some silicone PSA compositions contain some crosslinking means (e.g., peroxide or hydrosilylation cure systems) in order to optimize various properties of the final adhesive product. In view of the high viscosity imparted by the polymer component, these PSA compositions are typically dispersed in an organic solvent for ease of application. Some of these PSAs contain reactive groups, which allow the compositions to be cured by exposure to moisture. When the proportions of the above described resin and polymer and other parameters are adjusted similar combinations can be formulated into coating compositions. Under certain other conditions without the use of solvents, hot melt PSAs can be obtained.

SUMMARY OF THE INVENTION

A hot melt adhesive composition comprises:
(1) a silicone resin having a silanol content of less than 2 wt % and comprised of monofunctional units represented by $R^1{}_3SiO_{1/2}$ and tetrafunctional units represented by $SiO_{4/2}$ where $R^1$ is a substituted or unsubstituted monovalent hydrocarbon radical,
(2) an organopolysiloxane comprised of difunctional units of the formula $R^2R^3SiO$ and terminal units of the formula $R^4{}_aX'_{3-a}SiG$— wherein $R^2$ is an alkoxy group or a monovalent unsubstituted or substituted hydrocarbon radical; $R^3$ is a monovalent unsubstituted or substituted hydrocarbon radical; $R^4$ is aminoalkyl or $R^1$ group, X' is a hydrolyzable group; G is a divalent group linking the silicon atom of the terminal unit with another silicon atom and a is 0 or 1,
(3) a silane crosslinker, and
(4) a catalyst.

The hot melt adhesive composition is useful in applications such as lamination, including but not limited to construction and assembly type applications, e.g., laminating substrates together. Alternatively, the hot melt adhesive composition is useful in applications such as encapsulation and sealing due to its self leveling and gap filling properties.

DETAILED DESCRIPTION OF THE INVENTION

Hot Melt Adhesive Composition

This invention pertains to a hot melt adhesive composition and processes for its production and use. The hot melt adhesive composition comprises: (1) 55 to 62% of the silicone resin, (2) 38 to 45% of the organopolysiloxane, (3) 0.1 to 5, alternatively 0.9 to 1.1%, of the silane crosslinker, and (4) 0.02% to 2%, alternatively 0.1% to 0.5% of the catalyst. The hot melt adhesive composition has a viscosity ranging from 5,000 to 30,000 mPa·s at 125° C., alternatively 8,000 to 25,000 mPa·s at 125° C. The hot melt adhesive composition may be free of filler. "Free of filler" means that the hot melt adhesive composition contains no particulate or an amount of particulate small enough to prevent the hot melt adhesive composition from having a viscosity greater than 30,000 mPa·s at 125° C.

(1) Silicone Resin

The silicone resin useful herein contains monofunctional units represented by $R^1_3SiO_{1/2}$ and tetrafunctional units represented by $SiO_{4/2}$. $R^1$ represents a substituted or unsubstituted monovalent hydrocarbon radical. Silicone resins of this type are well known in the art as one of the ingredients present in organosiloxane compositions used as pressure sensitive adhesives.

The silicone resin is soluble in liquid hydrocarbons such as benzene, toluene, xylene, heptane and the like or in liquid organosilicon compounds such as a low viscosity cyclic and linear polydiorganosiloxanes.

In the $R^1_3SiO_{1/2}$ unit, $R^1$ is typically a monovalent hydrocarbon radical containing up to 20 carbon atoms, typically from 1 to 10 carbon atoms. Examples of suitable hydrocarbon radicals for $R^1$ include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl. Non-reactive substituents that can be present on $R^1$ include but are not limited to halogen and cyano. Typical substituted hydrocarbon radicals that can be represented by $R^1$ include but are not limited to chloromethyl and 3,3,3-trifluoropropyl.

At least one-third, alternatively at least two-thirds of the $R^1$ radicals in the $R^1_3SiO_{1/2}$ unit are methyl radicals. Examples of $R^1_3SiO_{1/2}$ units include but are not limited to $Me_3SiO_{1/2}$, $PhMe_2SiO_{1/2}$ and $Me_2ViSiO_{1/2}$ where Me, Ph and Vi denote methyl, phenyl and vinyl, respectively. The silicone resin may contain two or more of these units.

The molar ratio of the $R^1_3SiO_{1/2}$ and $SiO_{4/2}$ units in the silicone resin is typically from 0.5/1 to 1.5/1, preferably from 0.6/1 to 0.9/1. These mole ratios are conveniently measured by $Si^{29}$ n.m.r. spectroscopy. This technique is capable of quantitatively determining the concentration of $R^1_3SiO_{1/2}$ ("M") and $SiO_{4/2}$ ("Q") derived from the silicone resin and from the neopentamer, $Si(OSiMe_3)_4$, present in the initial silicone resin, in addition to the total hydroxyl content of the silicone resin.

For the purposes of the present invention the $R^1_3SiO_{1/2}$ to $SiO_{4/2}$ ratio can be expressed as {M(resin)+M(neopentamer)}/{Q(resin)+Q(neopentamer)} and represents the ratio of the total number of triorganosiloxy groups of the resinous and neopentamer portions of the silicone resin to the total number of silicate groups in the resinous and neopentamer portions.

The silicone resin contains 2.0 wt % or less, alternatively 0.7 wt % or less, alternatively 0.3 wt % or less, of terminal units represented by the formula $XSiO_{3/2}$, where X represents hydroxyl or a hydrolyzable group such as alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. The concentration of silanol groups present in the silicone resin can be determined using Fourier transform infrared spectrophotometry (FTIR).

The number average molecular weight, $M_n$, required to achieve the desired flow characteristics of the silicone resin will depend at least in part on the molecular weight of the silicone resin and the type(s) of hydrocarbon radicals, represented by $R^1$, that are present in this ingredient. $M_n$ as used herein represents the molecular weight measured using gel permeation chromatography, when the peak representing the neopentamer is excluded form the measurement. The $M_n$ of the silicone resin is typically greater than 3,000, more typically from 4500 to 7500. Typically the thermal hold (i.e. the ability of an adhesive to retain its adhesion at elevated temperatures) above 150° C., becomes appreciable when the $M_n$ exceeds 3000.

The silicone resin can be prepared by any suitable method. Silicone resins of this type have reportedly been prepared by cohydrolysis of the corresponding silanes or by silica hydrosol capping methods known in the art. The silicone resin is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310.

The intermediates used to prepare the silicone resin are typically triorganosilanes of the formula $R^1_3SiX'$, where X' represents a hydrolyzable group, and either a silane with four hydrolyzable groups such as halogen, alkoxy or hydroxyl, or an alkali metal silicate such as sodium silicate.

It is desirable that the silicon-bonded hydroxyl groups (i.e., $HOR^1SiO_{1/2}$ or $HOSiO_{3/2}$ groups) in the silicone resin be below 0.7% by weight of the total weight of the silicone resin, alternatively below 0.3%. Silicon-bonded hydroxyl groups formed during preparation of the silicone resin are converted to trihydrocarbylsiloxy groups or a hydrolyzable group by reacting the silicone resin with a silane, disiloxane or disilazane containing the appropriate terminal group. Silanes containing hydrolyzable groups are typically added in excess of the quantity required to react with the silicon-bonded hydroxyl groups of the silicone resin.

(2) Organopolysiloxane

The organopolysiloxane useful herein is comprised of difunctional units of the formula $R^2R^3SiO$ and terminal units of the formula $R^1_aX'_{3-a}SiG$— wherein $R^2$ is an alkoxy group or a monovalent unsubstituted or substituted hydrocarbon radical; $R^3$ is a unsubstituted or substituted monovalent hydrocarbon radical; $R^1$ is a group as described above, X' is a hydrolyzable group; G is an oxygen atom or a divalent group linking the silicon atom of the terminal unit with another silicon atom and a is 0 or 1. The organopolysiloxane can optionally contain up to 20%, based on total of trifunctional units of the formula $R^3SiO_{3/2}$ where $R^3$ is as described previously. At least 50%, typically at least 80%, of the radicals represented by $R^2$ and $R^3$ in the $R^2R^3SiO$ units are lower alkyl such as methyl.

The terminal units present on the organopolysiloxane are represented by the formula $R^1_aX'_{3-a}SiG$—, where X' is a hydrolyzable group, $R^1$ is a group as described above, G is an oxygen atom or a divalent group linking the silicon atom of the terminal unit with another silicon atom and subscript a is 0 or 1. Typically the organopolysiloxane contains an average of two or more hydrolyzable (X') groups per molecule in order to form a crosslinked product. Typical hydrolyzable groups represented by X' include but are not limited to hydroxy, alkoxy such as methoxy and ethoxy, alkenyloxy such as isopropenyloxy, enoxy, ketoximo such as methyethylketoximo, carboxy such as acetoxy, amidoxy such as acetamidoxy and aminoxy such as N,N-dimethylaminoxy.

In the terminal groups when a is 0 the groups represented by X' can be alkoxy, ketoximo, alkenyloxy, carboxy, aminoxy or amidoxy. When a is 1 X' is typically alkoxy and $R^5$ is alkyl such as methyl or ethyl, or aminoalkyl such as aminopropyl or 3-(2-aminoethylamino)propyl. The amino portion of the aminoalkyl radical can be primary, secondary or tertiary.

In the formula for the terminal unit G is a divalent group or atom that is hydrolytically stable. By hydrolytically stable it is meant that it is not hydrolyzable and links the silicon atom(s) of the terminal unit to another silicon atom in the organopolysiloxane such that the terminal unit is not removed during curing of the composition and the curing reaction is not adversely affected. Hydrolytically stable linkages represented by G include but are not limited to oxygen, hydrocarbylene such as alkylene and phenylene, hydrocarbylene containing one or more hetero atoms selected from oxygen, nitrogen and sulfur, and combinations of these linking groups. G can represent a silalkylene linkage such as —(OSiMe$_2$)CH$_2$CH$_2$—, —(CH$_2$CH$_2$SiMe$_2$)(OSiMe$_2$)CH$_2$CH$_2$—, —(CH$_2$CH$_2$SiMe$_2$)O—, (CH$_2$CH$_2$SiMe$_2$)OSiMe$_2$)O—, —(CH$_2$CH$_2$SiMe$_2$)CH$_2$CH$_2$— and —CH$_2$CH$_2$—, a siloxane linkage such as —(OSiMe$_2$)O— or, more preferably, an oxygen atom.

Specific examples of preferred terminal units include, but are not limited to, (MeO)$_3$SiCH$_2$CH$_2$—, (MeO)$_3$SiO—, Me(MeO)$_2$SiO—, (EtO)$_3$SiO—, (MeO)$_3$SiCH$_2$CH$_2$SiMeCH$_2$SiMeCH$_2$CH$_2$SiMe$_2$O—, and CH$_2$=C(CH$_3$)OSiO—. Me in these formulae represents methyl and Et represents ethyl.

When X' contains an alkoxy group, it may be desirable to separate this X' group from the closest siloxane unit by an alkylene radical such as ethylene. In this instance R$^1_a$X'$_{3-a}$SiG— would be (MeO)$_3$SiCH$_2$CH$_2$Si(Me$_2$)O—. Methods for converting alkoxy groups to trialkoxysilylalkyl groups are described in the prior art. For example, moisture reactive groups having the formulae (MeO)$_3$SiO— and Me(MeO)$_2$SiO— can be introduced into a silanol-terminated polyorganosiloxane by compounds having the formulae (MeO)$_4$Si and Me(MeO)$_3$Si, respectively. Alternatively, compounds having the formulae (MeO)$_3$SiH and Me(MeO)$_2$SiH, respectively, can be used when the polyorganosiloxane contains alkenyl radicals such as vinyl and a platinum group metal or a compound thereof as a hydrosilylation reaction catalyst. It will be understood that other hydrolyzable groups such as dialkylketoximo, alkenyloxy and carboxy can replace the alkoxy group.

The organopolysiloxane used in the hot melt adhesive is preferably a polydimethylsiloxane containing three alkoxy or ketoximo groups, two ketoximo groups or two alkoxy groups together with either an alkyl or aminoalkyl radical.

The viscosity of the organopolysiloxane may be in the range of 0.02 Pa·s to 100 Pa·s at 25° C., typically 0.35 to 60 Pa·s.

The silicone resin and organopolysiloxane are present in amounts to provide a weight ratio of (1) silicone resin to (2) organopolysiloxane, i.e., resin/polymer ratio, ranging from 55/45 to 70/30. The amount of silicone resin is the weight of silicone resin solids; however the silicone resin may optionally be dissolved in a solvent. Alternatively, higher amounts of silicone resin can be used, however, higher application temperatures will be needed to apply the moisture curable hot melt adhesive composition to a substrate.

(3) Silane Crosslinker

The silane crosslinker is represented by the formula R$^1_a$SiZ$_{(4-n)}$, where R$^1$ is as described previously and Z is a hydrolyzable group that reacts with the terminal groups of at least the organopolysiloxane under ambient conditions to form a cured material and n is 0, 1 or 2. Typically R$^1$ is an alkyl and/or a phenyl group. Suitable hydrolyzable groups represented by Z include but are not limited to alkoxy containing from 1 to 4 carbon atoms, carboxy such as acetoxy, ketoximo such as methylethylketoximo and aminoxy. When n=2 in the silane crosslinker, the organopolysiloxane typically contain 3 X' groups (e.g., a=0).

Suitable silane crosslinkers include but are not limited to methyltrimethoxysilane, isobutyltrimethoxysilane, methyltris(methylethylketoximo)silane, methyltriethoxysilane, isobutyltriethoxysilane, methyltriacetoxysilane and alkyl orthosilicates such as ethyl orthosilicate.

The amount of silane crosslinker used is in the range of 0.1 to 15 parts per hundred based on the amount of silicone resin and polymer, typically 0.1 to 5 pph. If too much silane crosslinker is present, the green strength and/or cure rate of the hot melt adhesive will decrease. If the silane crosslinker is volatile it may be necessary to use an excess amount to achieve the 0.1 to 15 pph in the final hot melt adhesive composition. One skilled in the art will be able to determine the amount need to produce a composition with 0.1 to 15 pph.

(4) Catalyst

A titanate catalyst is typically used in the hot melt adhesive formulation. The titanate catalyst is an organotitanium compound such as tetrabutyl titanate and partially chelated derivatives of these salts with chelating agents such as acetoacetic acid esters and beta-diketones. The amount of titanate catalyst used is in the range of 0.02 pph to 2 pph based on the combined amount of silicone resin and organopolysiloxane, typically in the range of 0.05 pph to 1 pph. If too much titanate catalyst is added then the cure of composition will be impaired. Additionally, as the amount of catalyst is increased the viscosity of the hot melt adhesive increases resulting in higher melt temperature required to apply the material.

(5) Adhesion Promoter

The hot melt adhesive composition may contain 0.05 pph to 2 pph based on silicone resin and organopolysiloxane of an adhesion promoter. Adhesion promoters are known in the art and are typically silanes having the formula R$^5_c$R$^6_d$Si(OR)$_{4-(c+d)}$ where R$^5$ is independently a substituted or unsubstituted, monovalent hydrocarbon group having at least 3 carbon atoms and R$^6$ contains at least one SiC bonded group having an adhesion-promoting group, such as amino, epoxy, mercapto or acrylate groups, c has the value of 0 to 2 and d is either 1 or 2 and the sum of c+d is not greater than 3. The adhesion promoter can also be a partial condensate of the above silane.

(6) Stabilizer

The hot melt adhesive composition may optionally further comprise a stabilizer. One skilled in the art would be able to select a suitable stabilizer and amount. For example, TINUVIN® products (such as TINUVIN® 765) from Ciba Specialty Chemicals are commercially available UV and light stabilizers. The exact amount of stabilizer depends on the type of stabilizer selected and the end use of the hot melt adhesive composition, however 0.1% to 4%, alternatively up to 0.15%, stabilizer based on the weight of the hot melt adhesive composition may be added.

(7) Pigment

The hot melt adhesive composition may optionally further comprise a pigment. The amount of pigment depends on the type of pigment selected and the desired degree of coloration of the cured hot melt adhesive product. For example, the hot melt adhesive composition may comprise 0 to 5%, alternatively up to 2%, of a pigment such as carbon black.

(8) Non-Functional Polyorganosiloxane

The hot melt adhesive composition may optionally further comprise a non-functional polyorganosiloxane. For purposes of this application, "Non-functional" means that the polyorganosiloxane does not participate in a moisture curing reaction. For example, the non-functional polyorganosiloxane may be comprised of difunctional units of the formula $R^7_2SiO$ and terminal units of the formula $R^8_3SiG—$, where each $R^7$ and each $R^8$ are independently a substituted or unsubstituted, monovalent hydrocarbon group exemplified by alkyl such as methyl, ethyl, propyl, and butyl, alkenyl such as vinyl, allyl, and hexenyl; and aryl such as phenyl, tolyl, xylyl, naphthyl, and phenethyl; and G is an oxygen atom or a divalent group linking the silicon atom of the terminal unit with another silicon atom, alternatively G is an oxygen atom. Non-functional polyorganosiloxanes are known in the art and are commercially available. Suitable non-functional polyorganosiloxanes are exemplified by, but not limited to, DOW CORNING® 200 Fluids, which are commercially available from Dow Corning Corporation of Midland, Mich., U.S.A. and may have viscosity ranging from 12,500 to 60,000 cSt.

Preparation of the Hot Melt Adhesive Composition

The process for preparing the hot melt adhesive composition comprises combining ingredients comprising (1) the silicone resin, (2) the organopolysiloxane, (3) the silane crosslinker, (4) the catalyst, and a solvent; feeding the combination through an extrusion device to remove volatiles; and recovering the hot melt adhesive composition, which has a nonvolatile content (NVC) of 97.5% to 100%, alternatively 98.5% to 100%, and alternatively 99% to 100%.

Solvent is typically used in producing the hot melt adhesive. Solvent aids with the flow and introduction of the silicone resin and organopolysiloxane. However, essentially all of the solvent is removed in the continuous process for producing the hot melt adhesive. By essentially it is meant that the hot melt adhesive composition should contain no more than 2.5%, alternatively less than 0.5% solvent based on the weight of the hot melt adhesive prepared by curing the hot melt adhesive composition.

Solvents used in this process are those that help fluidize the ingredients used in producing the hot melt adhesive composition but essentially do not react with any of the ingredients in the hot melt adhesive composition. Suitable solvents are organic solvents such as toluene, xylene, methylene chloride, naphtha mineral spirits, and low molecular weight siloxanes such as hexamethyldisiloxane, octamethyltrisiloxane, hexamethylcyclotrisiloxane, and combinations thereof.

The silicone resin, organopolysiloxane, silane crosslinker, catalyst, and solvent and any optional ingredients are fed into a continuous mixing device. The order of addition into the continuous mixing device is not critical to produce the hot melt adhesive composition. If the resin has typically more than 0.7% silanol it is desirable to add the silane crosslinker and/or catalyst and resin together to allow for any reaction to take place and the reaction product (e.g., volatiles) to be removed. The continuous mixing device should be capable of mixing the ingredients and should include means for removing the solvent. Typically an extrusion device is used, and more typically a twin-screw extrusion device is used.

When using a extrusion device the components are fed into the extruder and heated to a temperature in the range of 50° C. to 250° C., alternatively 80° C. to 150° C. By heating the ingredients in the extruder, the viscosity is lowered to allow for adequate mixing the ingredients. In this process, typically the silicone resin, organopolysiloxane, and solvent are fed into the extrusion device first. The silane crosslinker and catalyst may also be added at this point or they may be added further downstream in the device after some mixing has taken place. The continuous process of hot melt adhesives on a co-rotating twin-screw extruder is described in T. Peitz, "Continuous Processing of Hot Melt Adhesives on Co-Rotating Twin Screw Extruders", 1996 Hot Melt Symposium, p. 37-45.

The solvent is removed during the continuous mixing process. Typically vacuum is applied on the continuous mixing device to facilitate removal of the solvent and any other volatiles that may be in the hot melt adhesive composition. Vacuum may be applied in a single or multiple stages on the continuous mixing device. It has been found that the use of multiple vacuum stages provides improved removal to the solvent. Because the silane crosslinker may be volatile, the silane crosslinker may be added after most of the solvent has been removed to prevent removal of the silane crosslinker with the solvent.

Method of Use

The hot melt adhesive composition can be used adhere at least two substrates together. Typically the hot melt adhesive composition is used as a layer between the two substrates to produce a laminate of the first substrate, the cured hot melt adhesive and the second substrate. The laminate structure produced herein is not limited to these three layers. Additional layers of cured hot melt adhesive and substrate may be applied. The layer of hot melt adhesive composition in the laminate may be continuous or discontinuous.

Furthermore, various materials may be used as the substrate. Suitable substrates to which the hot melt adhesive composition, or cured product thereof, may be applied include, but are not limited to, glass; metals, such as aluminum, copper, gold, nickel, silicon, silver, stainless steel alloys, and titanium; ceramic materials; plastics including engineered plastics such as epoxies, polycarbonates, poly (butylene terephthalate) resins, polyamide resins and blends thereof, such as blends of polyamide resins with syndiotactic polystyrene such as those commercially available from The Dow Chemical Company of Midland, Mich., U.S.A., acrylonitrile-butadiene-styrenes, styrene-modified poly(phenylene oxides), poly(phenylene sulfides), vinyl esters, polyphthalamides, polyimides, polytetrafluoroethylene sold as TEFLON® by Du Pont of Wilmington, Del., U.S.A., and polyvinylidenefluoride sold as KYNAR® by Arkema, Inc. of Philadelphia, Pa., U.S.A.; cellulosic substrates such as paper, fabric, and wood; foams derived from polymeric materials such as polystyrene, polyurethane, polyisocyanurate, and polyorganosiloxanes; and combinations thereof. When more than one substrate will be used, there is no requirement for the substrates to be made of the same material. For example, it is possible to form a laminate of a glass and metal substrate or glass and plastic substrate. Alternatively, one type of substrate may be used, for example, it is possible to form a laminate of two or more wood substrates adhered together with the cured hot melt adhesive.

One method for producing the laminate structure is to apply a film of the hot melt adhesive composition on the surface of the first substrate. A surface of the second substrate is then contacted with the hot melt adhesive composition and the first and second surfaces are pressed together. Conventional application methods suitable for use with molten materials include, but are not limited to, dipping, spraying, co extrusion, roll coating, and spreading using heated doctor blades, draw-down bars and calendar rolls. The hot melt adhesive composition may be applied by heating at a temperature ranging from 80° C. to 165° C., alternatively 80° C. to 150° C. and applied by spraying or fiberizing. The resulting film of hot melt adhesive composition may be sufficient to provide an average of 0.5 gram to 50 grams, alternatively 1 gram, of hot melt adhesive composition per square foot of substrate surface area. Alternatively, the film may have an average thickness ranging from 1 to 200 micrometers, alternatively 10 to 50 micrometers. Spraying equipment for this type of application is known in the art and commercially available. One skilled in the art would recognize that spraying creates a nonuniform film that may vary in thickness and substrate coverage. Suitable application equipment may be obtained from ITW Dynatec, Graco, or Nordson.

The hot melt adhesive composition cures upon exposure to moisture. The hot melt adhesive composition may be exposed to moisture by contacting moisture in the air or by direct introduction of moisture such as from contacting the laminate with steam or placing the laminate in a humidity chamber.

It is also possible to form a laminate by forming a film of the hot melt adhesive composition, and then curing the film of the hot melt adhesive composition. A first surface of the cured film is contacted with a surface of the first substrate. A surface of the second substrate is then contacted with the other surface of the cured film and the first and second surfaces are pressed together to form the laminate.

Another alternative to producing the laminate is to apply a film of the hot melt adhesive composition on the surface of the first substrate. The hot melt adhesive composition is then cured by exposure to moisture to produce the cured film. The second substrate is then contacted with the cured film on the first substrate and the first and second surfaces are pressed together to form the laminate. The second substrate may be removable.

The cured films prepared by curing the hot melt adhesive compositions according to this invention find utility in various industries such as automotive, electronic, construction, space, textile, food, water supply, and medical. Alternatively, the cured films may find utility in the solar or transportation industries. The cured films may provide bonds that are resistant to hostile environments such as heat, moisture, sunlight, and/or electrical circuits. For example, the cured films may be used as conformal coatings for substrates such as printed circuit boards and other substrates containing electrical or electronic components. E.g., the cured films may used in weather sealing applications for photovoltaic cells. Alternatively, the cured films may be useful as adhesives for substrates in the solar industry.

Various laminates may be prepared according to this invention using the hot melt adhesive compositions. For example, the laminate may be a portion of an air bag, a car interior, a window, a lid seal, or insulation sheathing. FIG. 1 shows a partial cross section of insulation sheathing 100 according to this invention. The insulation sheathing 100 includes a board 101 and a foam 102 bonded together with a thin film of cured hot melt adhesive 103. The board 101, can be, for example, wood, cardboard, Masonite, a plastic such as vinyl, or metal.

FIG. 2 shows a schematic representation of a housing 200 for an electronic component 204 with a lid seal prepared according to this invention. The housing 200 may be prepared by, for example, (1) applying the hot melt adhesive composition 201 described above onto the rim of a first substrate shown here as a container 202,
(2) placing a second substrate shown here as a lid 203 over the container 202 such that the edges of the lid 203 are in contact with the hot melt adhesive composition 201, and
(3) curing the hot melt adhesive composition 201 to form a lid seal between the container 202 and the lid 203.

One skilled in the art would recognize that the hot melt adhesive composition may be applied to the edges of the lid 203 first and thereafter the lid 203 placed onto the container 202. One skilled in the art would recognize that curing the hot melt adhesive composition 201 may be performed before, during, or after application to one or both of the substrates (lid 203 and container 202). Alternatively, the hot melt adhesive composition or hot melt adhesive formed by curing the hot melt adhesive composition may be applied at the edges of the lid after the lid has been placed onto the container.

EXAMPLES

The examples are intended to illustrate the invention to one of ordinary skill in the art and should not be interpreted to limit the scope of the invention set forth in the claims. The ingredients used in these examples are as follows.
Materials:
Silicone Resins Resin B: a xylene soluble resinous copolymer containing triorganosiloxy units and $SiO_2$ units in the molar ratio of 0.8. The resin is capped with trimethylsiloxy groups to produce a resin with 0.7% of Si bonded hydroxyl groups. The resin is dissolved in xylene to produce a solution of 75% solids.
Organopolysiloxanes Polymer A: a primarily linear polydimethylsiloxane polymer of approximate viscosity 70,000 cs, terminated by $-CH_2CH_2-(CH_3)_2SiOSi(CH_3)_2-CH_2CH_2Si(OMe)_3$ end groups.
Crosslinkers Alkoxy silane A: i-Bu Si(OMe)$_3$, isobutyltrimethoxysilane L-90 Silica—a fumed silica of 100 sq m/g surface area available from Cabot Corporation.
Titanate Catalysts Titanate catalyst A: Ti(OtBu)$_4$, tetra-tertiary butyl titanium
Testing Methods:
NVC:

The nonvolatile content (NVC) was measured by gas chromatography using decane as an internal standard.
Gas Chromatography Procedure:

Samples were prepared using 1 gram of hot melt adhesive composition diluted in 4 grams of HPLC-grade heptane and 0.04 grams HPLC-grade decane. The blend was mixed on a vortex-type mixer until the sample completely dissolved into the solvents. Using a micropipette, samples were transferred to GC vial and placed into the auto-sampler of a gas chromatograph instrument such as a Hewlett-Packard 5890 Series II equipped with a HP-1 column using a total flow rate of 114.0 mL per minute. A test program was set up such that a 1-microliter sample was injected at an initial temperature of 40° C.; the temperature was ramped up at 15° C. per minute to 170° C. followed by a ramp at 70° C. per minute to 280° C.; and, the temperature was held at 280° C. for 5 minutes. Peaks for the xylene isomers, isobutyltetramethoxysilane, tetrakis (trimethylsiloxy)silane, methanol and t-butanol were then used to calculate the volatile content in each hot-melt adhesive composition.

Viscosity:

The dynamic shear viscosity was measured at an oscillation frequency of 1 Hz over a temperature range of 100° C. to 140° C. using a suitable rheometer (TA Instruments ARES rheometer from New Castle, Del., USA) equipped with a parallel plate geometry. The plates were 2.5 cm in diameter and the gap between the plates was referenced at the starting temperature 100° C. A hot-melt adhesive sample was loaded onto the bottom plate and the top plate was lowered to produce a sample thickness between 0.15 and 0.20 cm. A heating ramp of 2° C./min in air and an initial dynamic strain of 2% were used. An autostrain option ensured that strain was increased incrementally to maintain a torque signal of at least 0.4 g-cm from the rheometer transducer. The gap between the plates was automatically adjusted at a rate of 2.5 micrometers per ° C. to compensate for the thermal expansion of the stainless steel plates.

Tensile:

The tensile properties were evaluated according to ASTM D 412. A 75-mil thick slab of hot-melt adhesive composition was molded between release liners (3M 9956) and cold pressed for five minutes. The slab was allowed to cure for 21 days at room temperature and 50% RH. Tensile dog-bones specimens (1 in×0.125 in) were cut out of the slab and pulled on an MTS RT/5 Tensometer (MTS Systems Corporation) at 500 mm/min, using a 50-lb load cell. Data analysis was accomplished using the MTS Systems TestWorks®4 (v 4.08B).

Examples 1-20 and Comparative Examples 1 to 4

Resin B and Polymer A were mixed initially in a 5-gallon metal pail, then fed by metering pump to the first barrel of a twin-screw compounder (TSC) for comparative examples 1 and 2. A pre-mixed slurry of Alkoxy silane A and Catalyst A was added downstream and mixed. The mixture was pumped into a 30 mm twin-screw extruder to produce an exit flow rate of about 10 lbs./hr. The barrel temperature (bl temp), screw speed (rpm) and vacuum conditions (vacuum mmHg) are provided in the tables. Examples 1-14 and comparative examples 3 and 4 used process conditions of feeding the Resin and Polymer in separate metered streams, through a heated static mixer, and into the TSC. The TSC was run at 250 to 500 rpm, depending on the feed rate.

In the twin screw extruder before each vacuum stage, were two reversing elements (10/10 left handed) that were used to create seal before the vacuum. Under each vacuum port, 3-4 long, conveying elements (42/42) were used so that more surface area and longer residence time was exposed to vacuum. Partial vacuum was used in the first port to prevent foaming, and higher vacuum (>20" Hg) in subsequent ports. Silane/Catalyst was added under pressure by a metering pump into the downstream portion of the compounder. The injection location was the thick phase of the hot melt, between vacuum ports three and four. A final vacuum stage was set to 13" Hg and 180° F. to remove reaction by-product. A total of four vacuum ports were used.

Nonvolatile content and viscosity were measured on the hot melt adhesive compositions prepared in each example. Tensile properties were measured of the cured hot melt adhesive according to the test method described above. The amounts of silicone resin, organopolysiloxane and catalyst and crosslinker, and the test results are shown in Table 1, below.

Examples 17, 19, 20, and 21

Single Lap-Shear Testing Procedure

Kynar® polyvinylidene fluoride (PVDF) sheets (obtained from Rowland Technologies, Wallingford, Conn.) were cut into 1×4 in² coupons. Lap-shear test specimens were constructed by sandwiching an adhesive test material between two coupons using a 1-inch overlap and a 0.002-inch bond line thickness. The lap-shear test specimens were inserted between two polytetrafluoroethylene-based release liners and hot-pressed for five minutes at 40° C. Excess adhesive was scraped off and the adhesive was allowed to condition (non-reactive) or cure (reactive) for three days. The lap-shear test specimens were pulled at a cross cross-head speed of 50 mm·min$^{-1}$ using MTS Alliance RT/5 tensometer, and the peak stress from multiple test specimens were averaged to provide a measure of adhesive strength. The results are in Table 2, below.

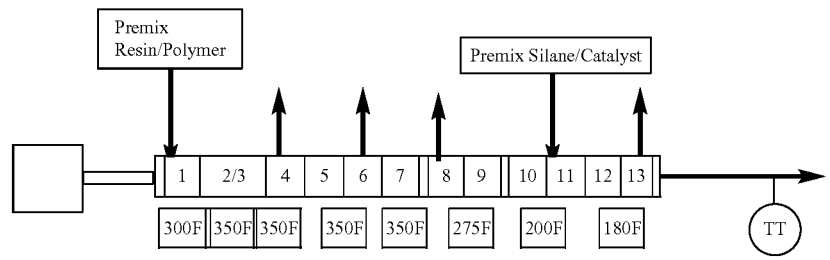

TABLE 1

| Example | Zone1 | Z2 | Z3 | Z4 | Z5 | Z6 | Z7 | Vacuum1 | V2 | V3 | V4 | V5 | r.p.m. | |
|---|---|---|---|---|---|---|---|---|---|---|---|---|---|---|
| 1 | 167 | 234 | 248 | 257 | 279 | 300 | 124 | 25 | 28 | 28 | 29 | 26 | 250 | Production Machine |
| 2 | 344 | 351 | 348 | 297 | 201 | 190 | 167 | 26 | 28 | 24 | Off | 14 | 300 | |
| 3 | 345 | 352 | 348 | 296 | 201 | 190 | 183 | 27 | 28 | 23 | Off | 14 | 300 | |
| Comparative Example 3 | 345 | 352 | 350 | 299 | 201 | 191 | 179 | 26 | 26 | 24 | Off | 13 | 300 | |
| 4 | 314 | 350 | 335 | 275 | 199 | 174 | 183 | 20 | 25 | 7 | 22 | 12 | 500 | Leak on V3 |
| 5 | 314 | 350 | 333 | 273 | 197 | 172 | 183 | 20 | 25 | 9 | 21 | 11 | 500 | Leak on V3 |
| 6 | 315 | 349 | 340 | 274 | 201 | 176 | 183 | 20 | 25 | 8 | 21 | 9 | 500 | Leaks on V3, V5 |
| 7 | 314 | 351 | 338 | 277 | 203 | 175 | 183 | 20 | 26 | 10 | 20 | 12 | 500 | Leak on V3 |

TABLE 1-continued

| | | | | | | | | | | | | | | |
|---|---|---|---|---|---|---|---|---|---|---|---|---|---|---|
| 8 | 311 | 350 | 346 | 277 | 201 | 180 | 182 | 20 | 25 | 22 | 27 | 13 | 500 | |
| 9 | 314 | 350 | 347 | 277 | 199 | 180 | 182 | 20 | 25 | 21 | 27 | 14 | 500 | |
| 10 | 308 | 350 | 346 | 276 | 201 | 176 | 182 | 19 | 26 | 22 | 26 | 13 | 500 | |
| Comparative Example 4 | 310 | 350 | 347 | 277 | 202 | 176 | 182 | 20 | 26 | 22 | 26 | 13 | 500 | |
| Comparative Example 1 | 315 | 351 | 350 | 200 | 201 | 200 | 200 | 26 | 27 | Off | Off | 12.5 | 400 | |
| Comparative Example 2 | 313 | 350 | 350 | 202 | 201 | 200 | 206 | 27.5 | 27 | Off | Off | 13.5 | 400 | |
| 11 | 266 | 246 | 253 | 264 | 289 | 314 | 127 | 26.0 | 28.4 | 28.8 | 28.9 | 10.7 | 250 | Production Machine |
| 12 | 266 | 246 | 253 | 264 | 289 | 314 | 127 | 26.0 | 28.4 | 28.8 | 28.9 | 10.5 | 250 | Production Machine |
| 13 | 266 | 246 | 253 | 264 | 289 | 314 | 127 | 26.0 | 28.3 | 28.8 | 28.9 | 10.2 | 250 | Production Machine |
| 14 | 266 | 246 | 253 | 264 | 289 | 314 | 127 | 26.0 | 28.3 | 28.8 | 28.9 | 10.0 | 250 | Production Machine |
| 15 | 261 | 230 | 248 | 280 | 318 | 347 | 244 | 27.1 | 28.6 | 28.8 | 28.8 | 27.9 | 350 | Production Machine |
| 16 | 259 | 230 | 250 | 280 | 316 | 345 | 243 | 27.1 | 28.5 | 28.7 | 28.8 | 28.0 | 350 | Production Machine |
| 17 | 259 | 232 | 250 | 280 | 316 | 343 | 243 | 27.0 | 28.5 | 28.7 | 28.8 | 28.1 | 350 | Production Machine |
| 18 | 259 | 232 | 250 | 280 | 315 | 343 | 243 | 27.1 | 28.5 | 28.7 | 28.8 | 28.1 | 350 | Production Machine |
| 19 | 252 | 345 | 354 | 358 | 363 | 192 | 194 | 18 | 22 | 22 | 23 | 16 | 500 | |
| 20 | 255 | 351 | 352 | 349 | 325 | 192 | 192 | 16 | 22 | 21 | 23 | 13 | 500 | |

| | Concentration, wt % | | | | | Viscosity, mPa·s (cP) | | Ultimate strength Tensile properties | | Using laminated 3 × 5 in² Plexiglas/foam spyro coated beads @ 1 g/ft² | |
|---|---|---|---|---|---|---|---|---|---|---|---|
| Example | Resin | Polymer | Cross-linker/catalyst | L-90 silica | NVC, % | 125° C. | 140° C. | Strength | Elongation | Green Strength After 15 sec | Creep After 1 minute |
| 1 | 59.2 | 39.4 | 1.4 | 0.0 | 98.4 | 25,000 | 15,000 | N/A | N/A | Passed | Passed |
| 2 | 57.2 | 41.4 | 1.4 | 0.0 | 98.4 | 18,000 | 11,000 | 570 | 1700 | Passed | Passed |
| 3 | 55.2 | 43.4 | 1.4 | 0.0 | 98.0 | 12,000 | 8,100 | N/A | N/A | Passed | Failed |
| Comparative Example 3 | 54.2 | 44.4 | 1.4 | 0.0 | 98.3 | 11,000 | 7,700 | 580 | 1800 | Failed | Failed |
| 4 | 58.2 | 40.4 | 1.4 | 0.0 | 98.5 | 17,700 | 11,200 | 290 | 1700 | Passed | Passed |
| 5 | 56.2 | 42.4 | 1.4 | 0.0 | 98.5 | 14,500 | 9,700 | 340 | 1700 | | |
| 6 | 58.2 | 40.4 | 1.4 | 0.0 | 98.6 | 13,800 | 9,300 | 240 | 1500 | | |
| 7 | 56.2 | 42.4 | 1.4 | 0.0 | 98.5 | 12,300 | 8,500 | 210 | 1500 | | |
| 8 | 58.2 | 40.4 | 1.4 | 0.0 | 98.3 | 16,300 | 10,600 | 484 | 1600 | | |
| 9 | 59.6 | 39.1 | 1.4 | 0.0 | 98.5 | 20,100 | 12,500 | 420 | 1700 | | |
| 10 | 56.7 | 41.9 | 1.4 | 0.0 | 98.5 | 24,100 | 15,600 | | | | |
| Comparative Example 4 | 54.2 | 44.4 | 1.4 | 0.0 | 98.6 | 19,000 | 13,100 | | | | |
| Comparative Example 1 | 51.7 | 42.3 | 1.3 | 4.7 | 98.5 | 31,000 | 21,000 | 1060 | 610 | N/A | N/A |
| Comparative Example 2 | 56.4 | 37.6 | 1.3 | 4.7 | 99.0 | 78,200 | 45,000 | 920 | 580 | N/A | N/A |
| 11 | 59.2 | 39.4 | 1.4 | 0.0 | 98.3 | 20,200 | 12,400 | 400 | 1580 | Passed | Passed |
| 12 | 59.2 | 39.4 | 1.4 | 0.0 | 98.1 | 21,500 | 12,800 | 480 | 1840 | Passed | Passed |
| 13 | 59.2 | 39.4 | 1.4 | 0.0 | 98.0 | 21,600 | 12,900 | 500 | 1820 | Passed | Passed |
| 14 | 59.2 | 39.4 | 1.4 | 0.0 | 98.2 | 20,200 | 12,100 | 400 | 1580 | Passed | Passed |
| 15 | 57.9 | 41.0 | 1.1 | 0.0 | 98.2 | 20,000 | 12,400 | 390 | 1600 | Passed | Passed |
| 16 | 57.4 | 41.5 | 1.1 | 0.0 | 98.1 | 19,100 | 11,800 | 470 | 1760 | Passed | Passed |
| 17 | 56.9 | 42.0 | 1.1 | 0.0 | 98.1 | 18,300 | 11,300 | 370 | 1630 | Passed | Passed |
| 18 | 56.4 | 42.5 | 1.1 | 0.0 | 98.1 | 16,600 | 10,700 | 420 | 1710 | Passed | Passed |
| 19 | 58.0 | 42.0 | 0.0 | 0.0 | 99.1 | 23,800 | 14,200 | N/A | N/A | | |
| 20 | 60.0 | 40.0 | 0.0 | 0.0 | 99.1 | 35,600 | 19,000 | N/A | N/A | | |

TABLE 2

| | | Peak stress (psi) from pulling lap shear specimens at 50 mm·min$^{-1}$ | | | |
|---|---|---|---|---|---|
| Rowlar ™ Fluoropolymer film[†] | Film thickness, mil | Example 19 | Example 20 | Example 17 | Example 21* |
| FBO MG 000 | 2 | 8.1 ± 0.2 | 9.2 ± 0.5[a] | 9.5[c] | 8.8 ± 0.4[c] |
| FBO GG 000 | 2 | 7.9 ± 0.6 | 10.0 ± 0.4[a] | 10.4[c] | 10.2 ± 0.3[c] |
| FBO MG 000c | 2 | 7.9 ± 0.6 | 9.8 ± 0.2[b] | 11.5[d] | 10.7 ± 0.2[a] |
| FBO MG 000c | 4 | 14.6 ± 0.7 | 18.0 ± 1.0 | 25.6[c] | 23.4 ± 0.8[e] |

[†]MG: matt on gloss; GG: gloss on gloss; c: corona-treated
[a]film stretched;
[b]film stretched and tore;
[c]film tore;
[d]film snapped and broke;
[e]film tore and snapped/broke
*This formulation of HM 2510 was not used in Table 1 listing the examples. The material is commercially available from Dow Corning Corporation of Midland, MI, U.S.A.

INDUSTRIAL APPLICABILITY

The hot melt adhesive compositions and hot melt adhesives prepared by curing the hot melt adhesive compositions find use in the construction industry and industrial assembly and maintenance applications. The hot melt adhesive composition is useful in applications such as lamination, including but not limited to construction and assembly type applications, e.g., laminating boards together. Alternatively, the hot melt adhesive composition is useful in applications such as encapsulation and sealing due to its self leveling and gap filling properties. For example, when the hot melt adhesive composition is put into a sheath, the low viscosity allows the hot melt adhesive to flow, fill gaps, seal, and cure.

DRAWINGS

REFERENCE NUMERALS

Figure 1:
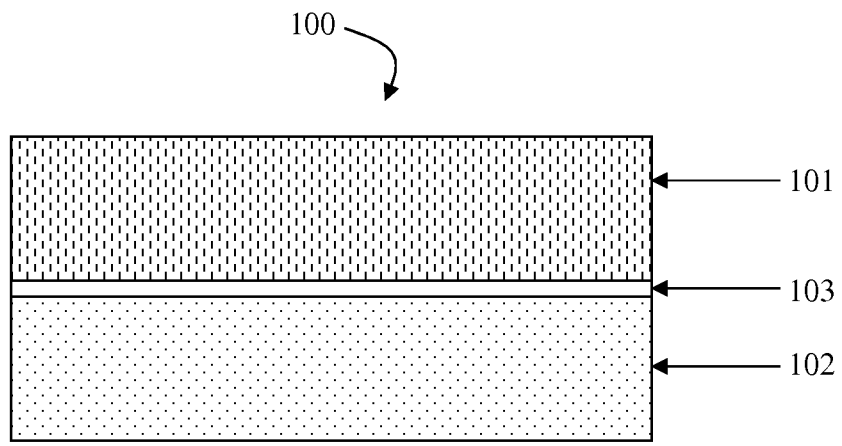
FIG. 1 is a portion of a window prepared according to this invention.
Figure 2:
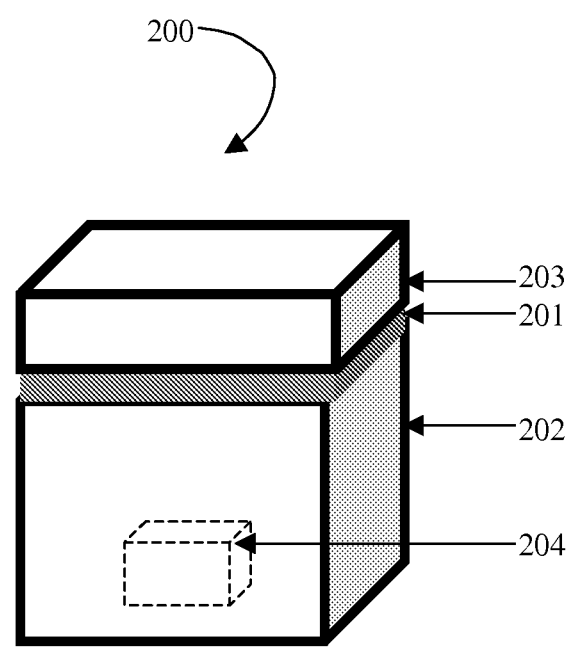
FIG. 2 is a schematic representation of a housing with a lid seal prepared according to this invention.

| 100 | insulation sheathing |
| --- | --- |
| 101 | board |
| 102 | polyisocyanurate foam |
| 103 | cured hot melt adhesive |
| 200 | housing |
| 201 | hot melt adhesive composition |
| 202 | container |
| 203 | lid |
| 204 | electronic component |

The invention claimed is:

1. A process for preparing a laminate article comprises:
   (i) applying by spraying or fiberizing, onto a first substrate, a hot melt adhesive composition having a viscosity ranging from 5,000 to 30,000 mPa·s at 125° C., where the hot melt adhesive composition comprises:
   (1) 55 to 62 parts of a silicone resin having a silicon-bonded hydroxyl group content of less than 0.7 wt % based on the total weight of the silicone resin and comprising monofunctional units represented by $R^1_3SiO_{1/2}$ and tetrafunctional units represented by $SiO_{4/2}$ where $R^1$ is a substituted or unsubstituted monovalent hydrocarbon radical,
   (2) 38 to 45 parts of an organopolysiloxane comprised of difunctional units of the formula $R^2R^3SiO$ and terminal units of the formula $R^4_aX'_{3-a}SiG$— wherein $R^2$ is an alkoxy group or a monovalent unsubstituted or substituted hydrocarbon radical; $R^3$ is a monovalent unsubstituted or substituted hydrocarbon radical; $R^4$ is aminoalkyl or $R^1$ group, X' is a hydrolyzable group; G is an oxygen atom or a divalent group linking the silicon atom of the terminal unit with another silicon atom and a is 0 or 1,
   (3) 0.1 to 5 parts of a silane crosslinker per hundred per part of silicone resin and organopolysiloxane, and
   (4) 0.02 to 2 parts of a titanate catalyst per hundred per part of silicone resin and organopolysiloxane;
   with the provisos that the hot melt adhesive composition is free of filler and the hot melt adhesive composition has a nonvolatile content of 97.5% to 100%, thereby forming a film;
   (ii) contacting a second substrate with the film; and
   (iii) curing the hot melt adhesive composition.

2. The process of claim 1, where step (i) is performed by heating the hot melt adhesive composition to a temperature ranging from 80° C. to 165° C.

3. The process of claim 1, where the film has a thickness ranging from 1 to 200 micrometers.

4. The process of claim 1, where the product of step (i) is an amount ranging from 0.5 to 50 grams per square foot of hot melt adhesive composition on the substrate.

5. The process of claim 4, where the first substrate and the second substrate are each independently selected from foams, glass, metals, ceramic materials, plastics, and cellulosic substrates.

6. The process of claim 5, where the first and second substrate are the same.

7. The process of claim 1, where the first substrate is wood.

8. The process of claim 7, where the second substrate is foam.

9. The process of claim 1, further comprising spraying the second substrate with the hot melt adhesive composition before step (ii).

10. The process of claim 1, where step (iii) is performed before step (ii), during step (ii) or both.

11. The process of claim 1, where step (iii) is performed by exposing the hot melt adhesive composition to moisture.

12. The process of claim 9, where the hot melt adhesive composition on the second substrate is fully or partially cured before step (iii).

13. A laminate prepared by the process of claim 1.

14. A process for preparing a laminate article comprises:
   (i) applying, onto a first substrate, a hot melt adhesive composition having a viscosity ranging from 5,000 to 30,000 mPa·s at 125° C., where the hot melt adhesive composition comprises:
   (1) 55 to 62 parts of a silicone resin having a silicon-bonded hydroxyl group content of less than 0.7 wt % based upon the total weight of the silicone resin and comprising monofunctional units represented by $R^1_3SiO_{1/2}$ and tetrafunctional units represented by $SiO_{4/2}$ where $R^1$ is a substituted or unsubstituted monovalent hydrocarbon radical,
   (2) 38 to 45 parts of a non-functional polyorganosiloxane comprised of difunctional units of the formula $R^7_2SiO$ and terminal units of the formula $R^8SiG$— wherein each $R^7$ and each $R^8$ are independently a substituted or unsubstituted, monovalent hydrocarbon group; and G is an oxygen atom or a divalent group linking the silicon atom of the terminal unit with another silicon atom,
   with the proviso that the hot melt adhesive composition has a nonvolatile content of 97.5% to 100%, thereby forming a film;
   (ii) contacting a second substrate with the film; and
   (iii) cooling the hot melt adhesive composition.

15. The process of claim 14, where step (i) is performed by spraying, fiberizing, roll coating, or extruding.

16. The process of claim 14 where step (i) is performed by heating the hot melt adhesive composition to a temperature ranging from 80° C. to 165° C.

17. The process of claim 14 where the film has a thickness ranging from 1 to 200 micrometers.

18. The process of claim 14, where the product of step (i) is an amount ranging from 0.5 to 50 grams per square foot of hot melt adhesive composition on the substrate.

19. The process of claim 18, where the first substrate and the second substrate are each independently selected from foams, glass, metals, ceramic materials, plastics, and cellulosic substrates.

20. The process of claim 19, where the first and second substrate are the same.

21. The process of claim 14, where the first substrate is wood.

22. The process of claim 21, where the second substrate is foam.

23. The process of claim 1, further comprising spraying the second substrate with the hot melt adhesive composition before step (ii).

24. The process of claim 14, where step (iii) is performed before step (ii), during step (ii) or both.

25. A laminate prepared by claim 14.

* * * * *